UNITED STATES PATENT OFFICE.

JULIUS WOLFF, OF EASTPORT, MAINE.

METHOD OF VENTING SEALED CANS.

SPECIFICATION forming part of Letters Patent No. 229,789, dated July 6, 1880.

Application filed May 19, 1880. (No model.)

*To all whom it may concern:*

Be it known that I, JULIUS WOLFF, of Eastport, in the county of Washington and State of Maine, have invented a new and useful Improvement in the Method of Venting Sealed Cans, of which the following is a specification.

This invention relates to an improvement in the method heretofore practiced of expelling the air contained in cans after they have been filled with fish packed in oil or other preservative substance or substances.

Before my invention the cans were first completely soldered up, then subjected to a bath of boiling water for from fifteen minutes to two and one-half hours, and on taking the cans out, and without permitting any cooling to take place, a small hole was made in the cover in order to permit of the escape of the air, and then such vent-hole was immediately soldered up.

My improvement consists in immersing the cans, after they are filled and before they are soldered, in heated oil and boiling out of the cans the air contained in them, and then, immediately after withdrawing the cans, soldering the covers on, thus doing away with the necessity of making a vent-hole after the soldering of the cover to the can.

To practice my invention I have a large vessel containing within it, at its bottom, a steam-coil. This vessel is filled with oil and steam let into the coil, and the oil thereby raised up to a temperature of about 215° Fahrenheit.

The cans being filled with fish and oil, and the covers placed on them, but without being soldered on, they are placed in a wire frame-work, in which the boxes may be tiered up to any extent, and then immersed in this heated-up oil and heated therein from about five to ten minutes. Then they are withdrawn, removed from the wire frame-work, and before they have had an opportunity to cool the covers are soldered down in the usual manner.

It will now be found that the cans, on cooling, are practically free from air, such as is their condition when, by the old method of procedure, they are punctured before they have been allowed to cool to give vent to the air, and then immediately soldered up. This withdrawal of the air takes place by the boiling of it out of the cans in the hot-oil bath, as at this step of the method the air will be seen leaving the surface of the body of the oil in the open kettle in bubbles.

An objection to the old method is, that in puncturing the can, after boiling to heat its contents, some of the oil is invariably forced out with the heated air; also, the whole of such old method is more tedious and expensive.

I claim—

The method of expelling the air from cans of fish packed in oil or other preservative substance or substances by first subjecting the cans and contents, with their covers on, but not soldered thereto, to a bath of heated oil, and soldering on such covers immediately after the cans have been withdrawn from the oil, substantially as described.

JULIUS WOLFF.

Witnesses:
 JAMES H. HUNTER,
 EDWARD O. HART.